United States Patent
Hernandez-Oliver et al.

(10) Patent No.: US 8,816,804 B2
(45) Date of Patent: Aug. 26, 2014

(54) SWITCH ASSEMBLY AND SYSTEM

(71) Applicant: Tyco Electronics Corporation, Berwyn, PA (US)

(72) Inventors: Salvador Hernandez-Oliver, Winston-Salem, NC (US); Thomas Michael Banas, Kernersville, NC (US); Roger L. Thrush, Clemmons, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 89 days.

(21) Appl. No.: 13/622,482

(22) Filed: Sep. 19, 2012

(65) Prior Publication Data

US 2013/0076465 A1    Mar. 28, 2013

Related U.S. Application Data

(60) Provisional application No. 61/537,830, filed on Sep. 22, 2011.

(51) Int. Cl.
*H01H 9/00* (2006.01)

(52) U.S. Cl.
USPC .......................... 335/205; 335/207

(58) Field of Classification Search
USPC ................................. 335/205–207
See application file for complete search history.

(56) References Cited

U.S. PATENT DOCUMENTS

| | | | |
|---|---|---|---|
| 4,447,801 A | 5/1984 | Masuda | |
| 4,556,861 A * | 12/1985 | Hyodo et al. | 340/441 |
| 4,596,150 A * | 6/1986 | Kuhr | 73/779 |
| 5,001,398 A | 3/1991 | Dunn | |
| 5,031,737 A | 7/1991 | Dzioba et al. | |
| 5,961,566 A * | 10/1999 | Heslop | 701/93 |
| 5,983,156 A * | 11/1999 | Andrews | 701/115 |
| 6,101,896 A | 8/2000 | Engelgau | |
| 7,497,737 B2 | 3/2009 | Mikolajczak | |
| 7,994,886 B2 * | 8/2011 | Bedell | 335/205 |
| 2006/0283276 A1 | 12/2006 | Komatsu et al. | |

FOREIGN PATENT DOCUMENTS

| | | |
|---|---|---|
| DE | 19855358 A1 | 6/2000 |
| DE | 102005060713 A1 | 6/2007 |
| DE | 102007047547 A1 | 4/2009 |
| FR | 2897933 A1 | 8/2007 |

OTHER PUBLICATIONS

"Application Note: Circuit Protection Considerations for Automotive Information Busses," Tyco Electronics, 2009.
International Rectifier Programmable Current-Sensing High Side Power Switches website pages.
International Search Report, International Application No. PCT/US2012/056179, International Filing Date, Sep. 20, 2012.

* cited by examiner

*Primary Examiner* — Shawki S Ismail
*Assistant Examiner* — Lisa Homza

(57) ABSTRACT

A switch assembly includes a magnet, a first Hall device, and a second Hall device. The first and second Hall devices are proximate the magnet. The first Hall device is configured to switch in relation to a first magnetic field threshold. The second Hall device is configured to switch in relation to a second magnetic field threshold. The first magnetic field threshold differs from the second magnetic field threshold.

16 Claims, 9 Drawing Sheets

SWITCH ASSEMBLY AND SYSTEM

CROSS REFERENCE TO RELATED APPLICATIONS

This application claims priority to U.S. Provisional Application No. 61/537,830, entitled "Brake Switch System and Assembly," filed Sep. 22, 2011, which is hereby incorporated by reference in its entirety.

BACKGROUND OF THE DISCLOSURE

The present application relates to a brake switch system and assembly configured for use with a vehicle, such as an automobile.

Automobiles and various other vehicles have brake systems that include rear brake lights. When a driver engages a brake pedal, the rear brake lights are activated in order to signal to other motorists that the vehicle is in the process of slowing down, and/or coming to a halt.

FIG. 1 illustrates a schematic block diagram of a conventional brake system 10. The system 10 includes a battery 12 that supplies power to an electro-mechanical switch 14 operatively connected to a brake pedal 16. The switch 14 is also electrically and operatively connected to rear brake lights 18.

In operation, as the brake pedal 16 is depressed, a portion of the brake pedal 16 physically contacts the switch 14. In this manner, the switch 14 closes and current flows to the brake lights 18, thereby illuminating the brake lights 18. Once the physical engagement between the brake pedal 16 and the switch 14 is broken, such as when a driver releases his/her foot from the brake pedal 16, the switch 14 is opened, current no longer flows to the brake lights 18, and the brake lights 18 are no longer illuminated.

Mechanical brake light switches, such as shown in FIG. 1, have been used for many years with mixed levels of reliability and convenience. These switches, which are used by many original equipment manufacturers, exhibit persistent wear issues and noise level concerns. Nevertheless, mechanical brake light switches continue to be used due to their low cost. However, with continued emphasis on improving reliability and comfort (for example, limiting noise), and the advent of electric vehicles, mechanical brake switches are being reevaluated.

FIG. 2a illustrates a schematic block diagram of a known brake system 20. The system 20 includes a battery 22 that provides power to a Hall effect sensor or device 24 that is in close proximity to a brake pedal 26 that is electrically connected to a relay 28, which, in turn, is connected to brake lights 30. The Hall device 24 is positioned proximate a magnet (not shown in FIG. 2). The brake pedal 26 is part of an assembly that includes a ferromagnetic target or plunger, as explained with respect to FIG. 2b.

FIG. 2b illustrates a simplified view of a driver 31 depressing the brake pedal 26. As shown in FIG. 2b, as the driver 31 presses the brake pedal 26 in the direction of arrow A, the ferromagnetic target in the form of a plunger 33 attached to the brake pedal assembly moves along with the brake pedal 26 in the direction of arrow A, away from the Hall device 24 and magnet.

Referring to FIGS. 2a and 2b, the Hall effect sensor or device 24 includes a transducer that varies its output voltage or current in response to a magnetic field. The Hall device 24 operates as a switch in the presence and absence of a magnetic field. Typically, the Hall device 24 is OFF when there is no magnetic field, and ON in the presence of a magnetic field.

The brake pedal 26 includes a ferromagnetic target or plunger 33, formed of steel (for example), attached to a portion thereto or formed thereon. When the brake pedal 26 is depressed, the ferromagnetic target or plunger 33 of the pedal 26 moves away from the Hall device 24. During this time, the magnetic field emitted from the magnet changes shape. The Hall device 24 detects this change and switches states, thereby closing the relay 28, which, in turn, activates the brake lights 30 (closing a circuit from the battery 22 to the brake lights 30). When the driver removes his/her foot from the brake pedal 26, the magnetic field changes back, the Hall device 28 switches back to its original state, thereby opening the relay 28 and deactivating the brake lights 30. As such, the system 20 provides a single non-contacting switch point that activates and deactivates the brake lights 30 depending on whether the brake pedal 26 is depressed or not.

FIG. 3 illustrates a schematic block diagram of the Hall device 24 in relation to a magnet 32. As shown, the magnet 32 is a U-shaped magnet having lateral posts 34 integrally connected to a cross-beam 36 that separates the posts 34 from one another by an internal gap 38. The Hall device 24 is positioned within the internal gap 38 between the posts 34.

The magnetic field is typically significant enough to exceed an operational threshold and remain in that state until the magnetic field is removed. In general, the magnetic field of the Earth will not activate the Hall device 24, but many common magnets will provide sufficient strength to activate the Hall device 24. The magnet 32 may be a bonded Neodymium-Iron-Boron (Nd—Fe—B) magnet, for example.

The Hall device 24 may be part of an integrated circuit secured to or embedded within the internal gap 38 between the posts 34. As shown in FIG. 3, the Hall device 34 is positioned within the internal gap 38 at an area 40 that experiences zero magnetic field. The Hall device 34 can also have a positive or negative bias in order to facilitate various magnetic switching characteristics.

FIG. 4 illustrates a schematic block diagram of the Hall device 24 in relation to the magnet 32 and the brake pedal 26. As the ferromagnetic plunger 33 of the brake pedal 26 moves away from the Hall device 24, the position of the zero magnetic field area 40 changes so that the Hall device 24 is no longer within the zero magnetic field area 40. As such, the Hall device 24 detects a change in magnetic field, and switches to an ON position. Thus, the relay 28 (shown in FIG. 2a) is closed, and the brake lights 30 (shown in FIG. 2a) are activated.

Various vehicles also include cruise control. A driver typically activates cruise control while driving on a highway, where the driver can operate a vehicle at a consistent rate of speed for an extended period of time. The cruise control feature allows the driver to drive the vehicle without keeping a foot on the accelerator.

In order to deactivate the cruise control, the driver typically taps the brake pedal. In doing so, however, the brake lights are typically activated. However, the vehicle may not, in reality, be slowing down. Thus, the activation of the brake lights may erroneously indicate that the vehicle is slowing, when the driver actually wishes to increase the velocity of the vehicle.

In general, known brake systems include contact-type connector assemblies that typically include a single switching point. As noted above, however, contact-type connector assemblies exhibit persistent wear issues and noise level concerns. Further, the single switching point may cause an erroneous indication of a vehicle slowing down, when an operator is merely deactivating cruise control.

BRIEF DESCRIPTION OF THE DISCLOSURE

In one embodiment, a switch assembly includes a magnet, and first and second Hall devices proximate the magnet. The first Hall device may be configured to switch based on a first magnetic field threshold. The second Hall device may be configured to switch based on a second magnetic field threshold. The first magnetic field threshold differs from the second magnetic field threshold. The first and second magnetic field thresholds may be first and second magnetic field strength thresholds.

The magnet may be a U-shaped magnet having opposed posts connected by a cross beam. The opposed posts and the cross beam define an internal gap. The first and second Hall devices may be positioned within the internal gap.

A magnetic field of the magnet changes when a ferromagnetic target moves in relation to the magnet. The ferromagnetic target may form part of, or be attached to, a brake pedal. For example, the ferromagnetic target may be a steel plunger connected to a brake pedal assembly.

The first Hall device may be operatively connected to a cruise control module. The first Hall device may switch to deactivate cruise control controlled by the cruise control module.

The second Hall device may be operatively connected to brake lights. The second Hall device may switch to control activation and deactivation of the brake lights.

The assembly may include a relay electrically connected between the second Hall device and the brake lights. Alternatively, the assembly may include a field-effect transistor (FET) electrically connected between the second Hall device and the brake lights.

The switch assembly may include a main housing having an internal chamber that retains a printed circuit board. The magnet, the first Hall device, and the second Hall device may be secured to the printed circuit board.

The switch assembly may also include a printed circuit board that securely supports the first and second Hall devices proximate a distal end of the printed circuit board. The first and second Hall devices may be configured to be proximate a ferromagnetic target. The first and second Hall devices may be configured to activate or deactivate first and second components, respectively, based on movement of the ferromagnetic target in relation to one or more of the magnet or the first and second Hall devices.

Certain embodiments provide a brake switch system including a brake pedal assembly having a ferromagnetic target, and a main housing that securely retains a circuit board and a magnet, wherein a portion of the brake pedal assembly is proximate a portion of the main housing. The circuit board may include a first Hall device proximate the magnet, wherein the first Hall device is configured to switch in relation to a first magnetic field threshold, and a second Hall device proximate the magnet, wherein the second Hall device is configured to switch in relation to a second magnetic field threshold. The first magnetic field threshold differs from the second magnetic field threshold.

Certain embodiments provide an assembly including a single main housing, and first and second Hall devices within the single main housing. The first Hall device is configured to control activation and/or deactivation of a first component. The second Hall device is configured to control activation and/or deactivation of a second component that is separate and distinct from the first component.

The first component may be a cruise control module or brake lights, and the second component may be the other of the cruise control module or brake lights.

BRIEF DESCRIPTION OF THE DRAWINGS

FIG. 2b illustrates a simplified view of a driver depressing a brake pedal of the known brake system shown in FIG. 2a.

DETAILED DESCRIPTION OF THE DISCLOSURE

Figure 1:
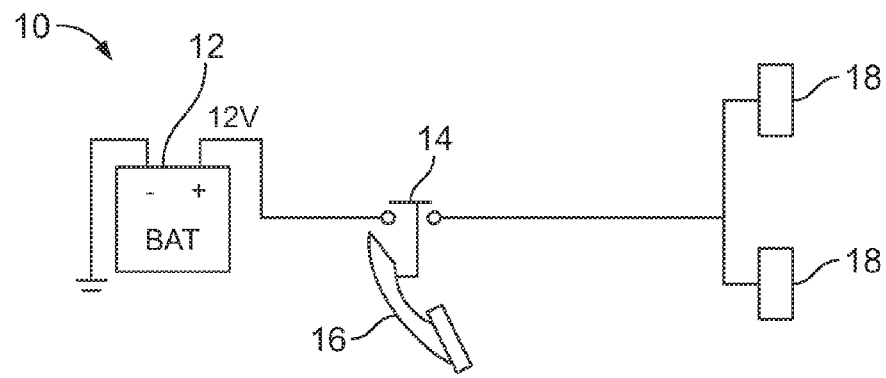
FIG. 1 illustrates a schematic block diagram of a conventional brake system.
Figure 2A:
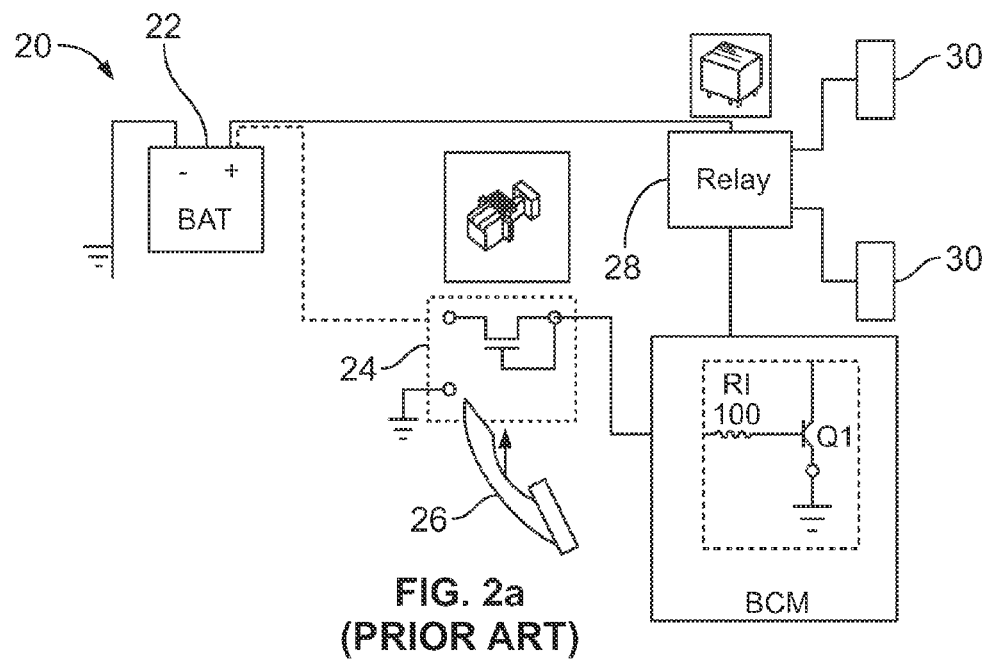
FIG. 2a illustrates a schematic block diagram of a known brake system.
Figure 2B:
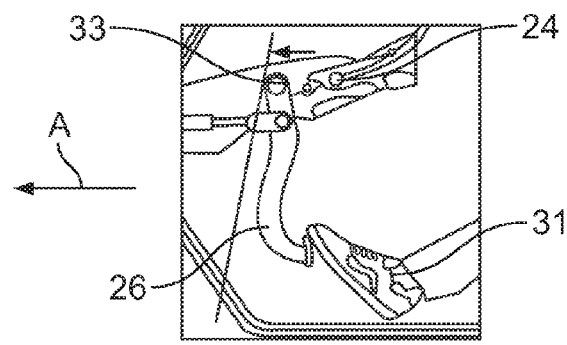
Figure 3:
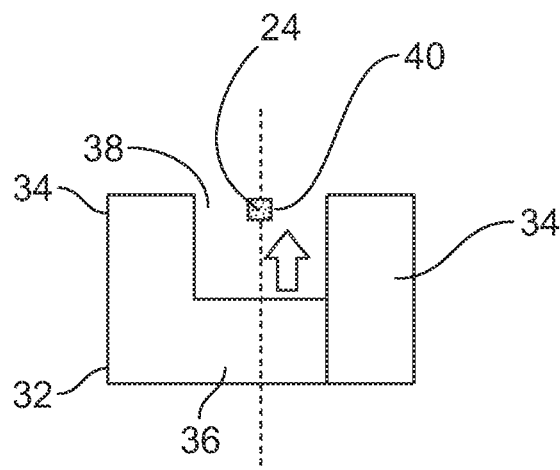
FIG. 3 illustrates a schematic block diagram of a Hall device in relation to a magnet.
Figure 4:
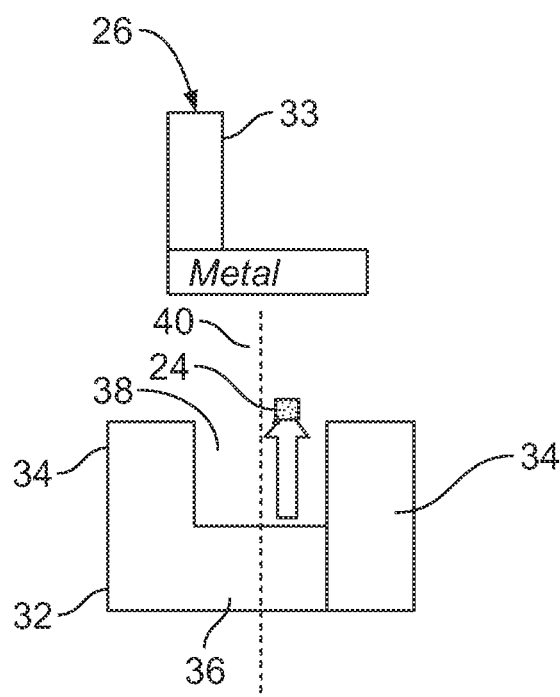
FIG. 4 illustrates a schematic block diagram of a Hall device in relation to a magnet and a brake pedal.
Figure 5:
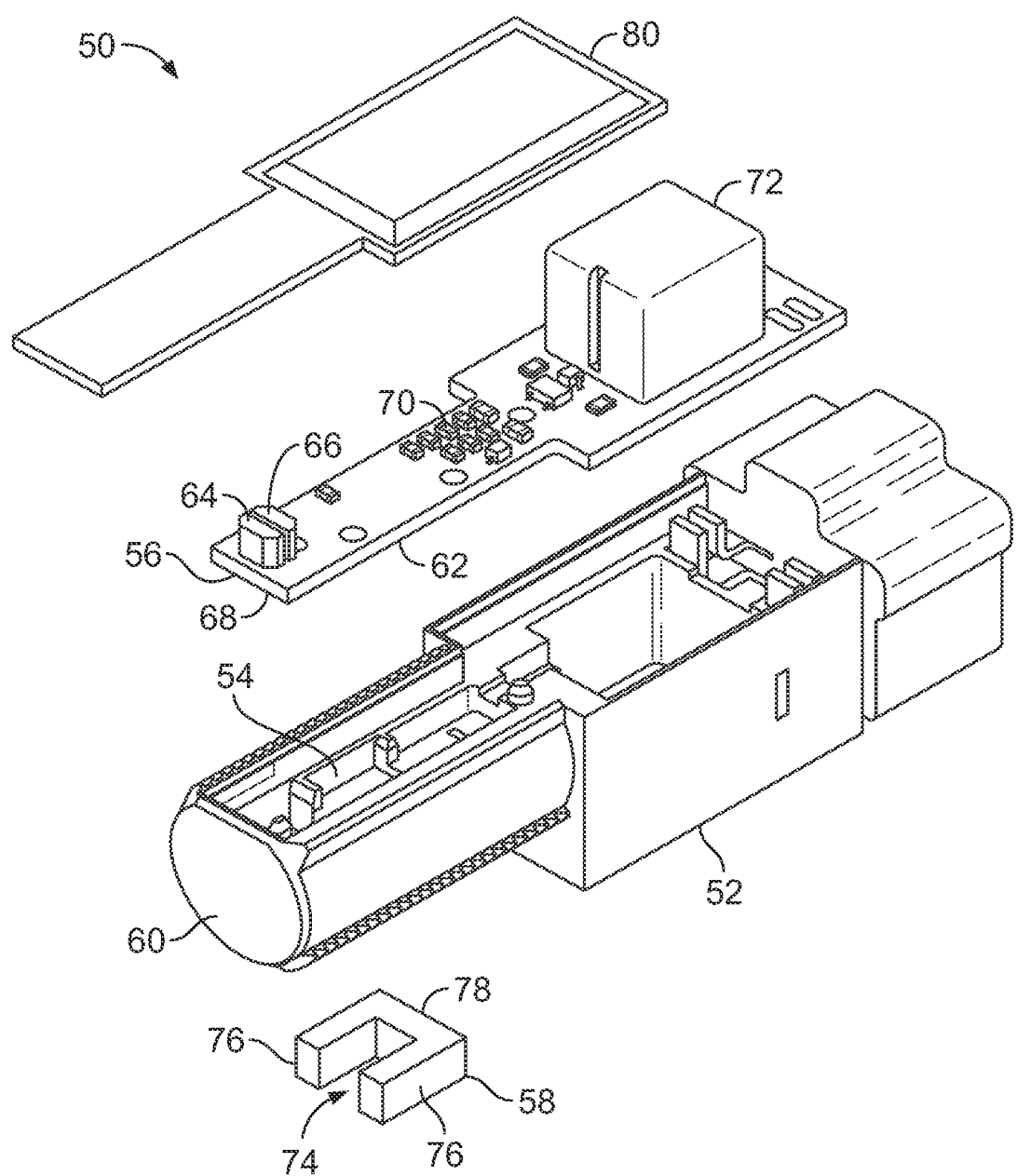
FIG. 5 illustrates an isometric exploded view of a switch assembly, according to an embodiment.

FIG. 5 illustrates an isometric exploded view of a switch assembly 50, according to an embodiment. The switch assembly 50 may be used with respect to any system, assembly, sub-assembly, or the like that is configured to utilize multiple switches. For example, the switch assembly 50 may be used as a brake switch assembly. For the sake of simplicity, the switch assembly 50 may be referred to as a brake switch assembly, but it is understood that the switch assembly 50 may be used in various applications other than brake systems or assemblies.

The brake switch assembly 50 includes a main housing 52 having an internal chamber 54 formed therein. The internal chamber 54 is configured to receive and retain a printed circuit board (PCB) subassembly 56 and magnet 58.

The housing 52 includes a stub nose 60 at a distal end. A ferromagnetic target of a brake pedal assembly, such as a plunger of a brake pedal, is configured to be proximate the stub nose 60. Alternatively, the ferromagnetic target may be stationary, and one or more Hall devices or switches may be located on the brake pedal assembly.

The PCB subassembly 56 includes a PCB 62 that securely supports two Hall devices 64 and 66 proximate a distal end 68 that is configured to be secured proximate the stub nose 60 of the housing 52. The PCB subassembly 56 also supports electrical components 70, such as capacitors, diodes, resistors, and the like, as well as an electromechanical relay 72.

The magnet 58 may be a U-shaped magnet. The magnet 58 is secured in the housing 52 proximate the distal end 68 of the PCB subassembly 56 such that the Hall devices 64 and 66 are positioned within an internal gap 74 defined between opposed posts 76 and a cross-beam 78. While the magnet 58 is shown as a U-shaped magnet, the size and shape of the magnet 58 may be various other shapes and sizes. For example, the magnet 58 may be a bar magnet positioned proximate the Hall device 64 and 66.

After the PCB subassembly 56 is secured within the housing 52, such as through soldering, and the magnet 58 is secured with respect to the Hall devices 64 and 66, a cover 80, which may be include potting material, for example, may be secured on the housing 52 over the PCB subassembly 56. Alternatively, the cover 80 may be formed of, or include, metal, plastic, elastomeric materials, and the like. The cover 80 ensures that the PCB subassembly 56 is securely and safely contained within the housing 52.

Figure 6:
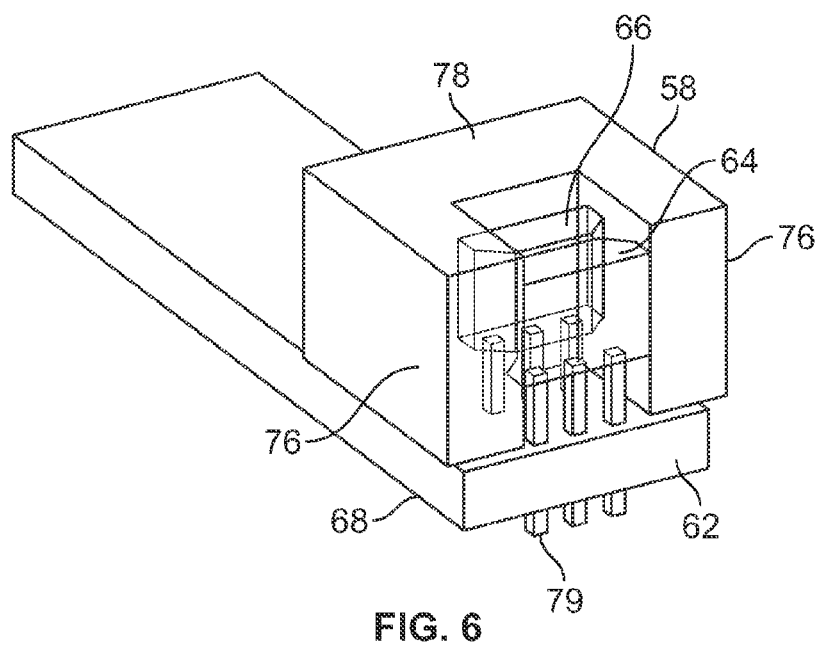
FIG. 6 illustrates a simplified isometric view of a magnet and Hall devices secured to a printed circuit board, according to an embodiment.

FIG. 6 illustrates a simplified isometric view of the magnet 58 and the Hall devices 64 and 66 secured to the PCB 62, according to an embodiment. Referring to FIGS. 5 and 6, as noted above, the magnet 58, which may include the opposed posts 76 and the cross beam 78 and may be secured to support posts 79 that extend through the PCB 62, and the Hall devices 64 and 66 are secured at a distal end 68 of the PCB 62, which is located proximate the stub nose 60 of the housing 52. In this manner, as a brake pedal that includes a ferromagnetic target or plunger moves away from the stub nose 60, the Hall devices 64 and 66 detect the changing magnetic field and switch ON or OFF in response. For example, the Hall device 64 that is operatively connected to the cruise control module may turn OFF, for example, switch from a high output to a low output, (thereby deactivating the cruise control), while the Hall device 66 that is operatively connected to the brake lights may turn ON, for example, switch from a low output to a high output, (thereby activating the brake lights). As the brake pedal approaches the stub nose 60, such as when a driver releases pressure from the brake pedal, the Hall devices 64 and 66 may switch to their previous states.

Optionally, the system may be configured such that when the brake pedal moves toward the stub nose 60, the Hall devices 64 and 66 switch OFF and ON, respectively. Also, alternatively, the system may be configured such that the Hall device 64 switches ON to deactivate the cruise control, while the Hall device 66 switches OFF to activate the brake lights.

Figure 7:
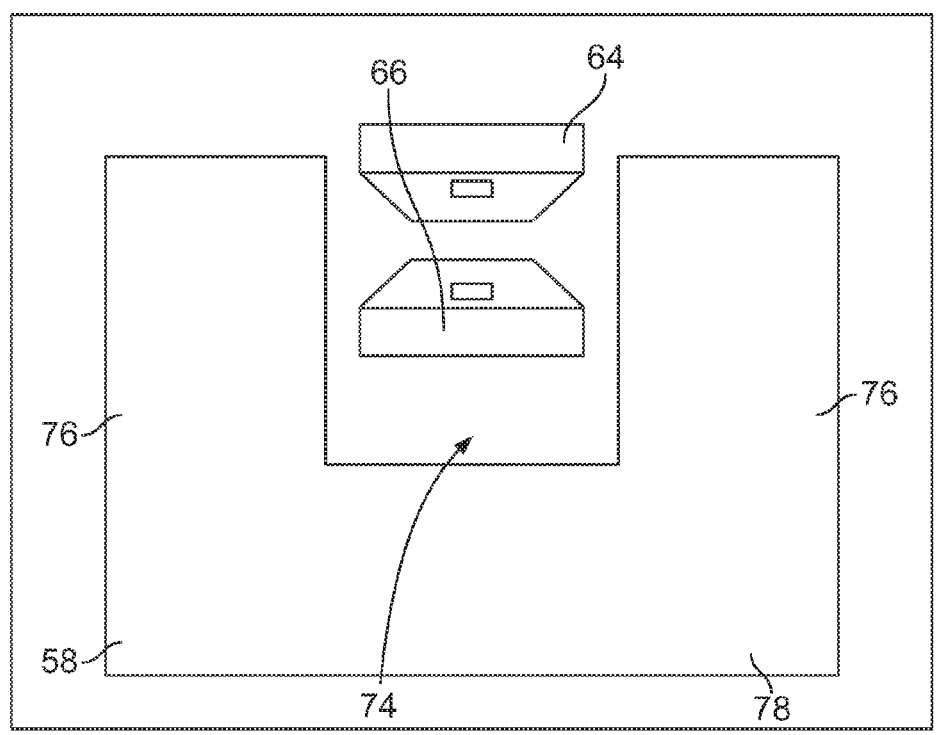
FIG. 7 illustrates a simplified top view of Hall devices secured with respect to a magnet, according to an embodiment.

FIG. 7 illustrates a simplified top view of the Hall devices 64 and 66 secured with respect to the magnet 58 (which may include the opposed posts 76 and the cross beam 78), according to an embodiment. As shown, the front Hall device 64 is closer to the stub nose 60 (shown in FIG. 5) than the rear Hall device 66. As such, the front Hall device 64 may sense a changing magnetic field before the rear Hall device 66, and/or the Hall devices 64 and 66 may be programmed such that the Hall device 64 switches states before the Hall device 66 switches states.

The front Hall device 64 may be configured to deactivate cruise control, while the rear Hall device 66 may be configured to close and open the relay 72 (shown in FIG. 5) in order to activate and deactivate brake lights. The cruise control may be deactivated with a slight tap of the brake pedal. With increased pressure on the brake pedal, the rear Hall device 66 then switches to an ON state and the brake lights may be activated. Note, however, that the cruise control may be deactivated with a slight tap of the brake pedal prior to the brake lights being activated, as discussed in more detail below.

Alternatively, the front Hall device 64 may be configured to control the brake lights, while the rear Hall device 66 may be configured to deactivate the cruise control. In this embodiment, the Hall devices 64 and 66 may be programmed to detect predetermined trigger points that are separate and distinct from one another in order to switch states and control their respective functions accordingly.

Also, alternatively, and as noted above, the magnet 58 may be various other shapes and sizes. For example, the Hall devices 64 and 66 may be secured on the PCB 62 in relation to a bar magnet that is positioned in front of, behind, or to the side of the Hall devices 64 and 66. Optionally, the bar magnet may be positioned between the Hall devices 64 and 66. In any embodiment, the Hall devices 64 and 66 may be programmed to switch states at predetermined trigger points (that is, when a change in magnetic field is detected).

Figure 8:
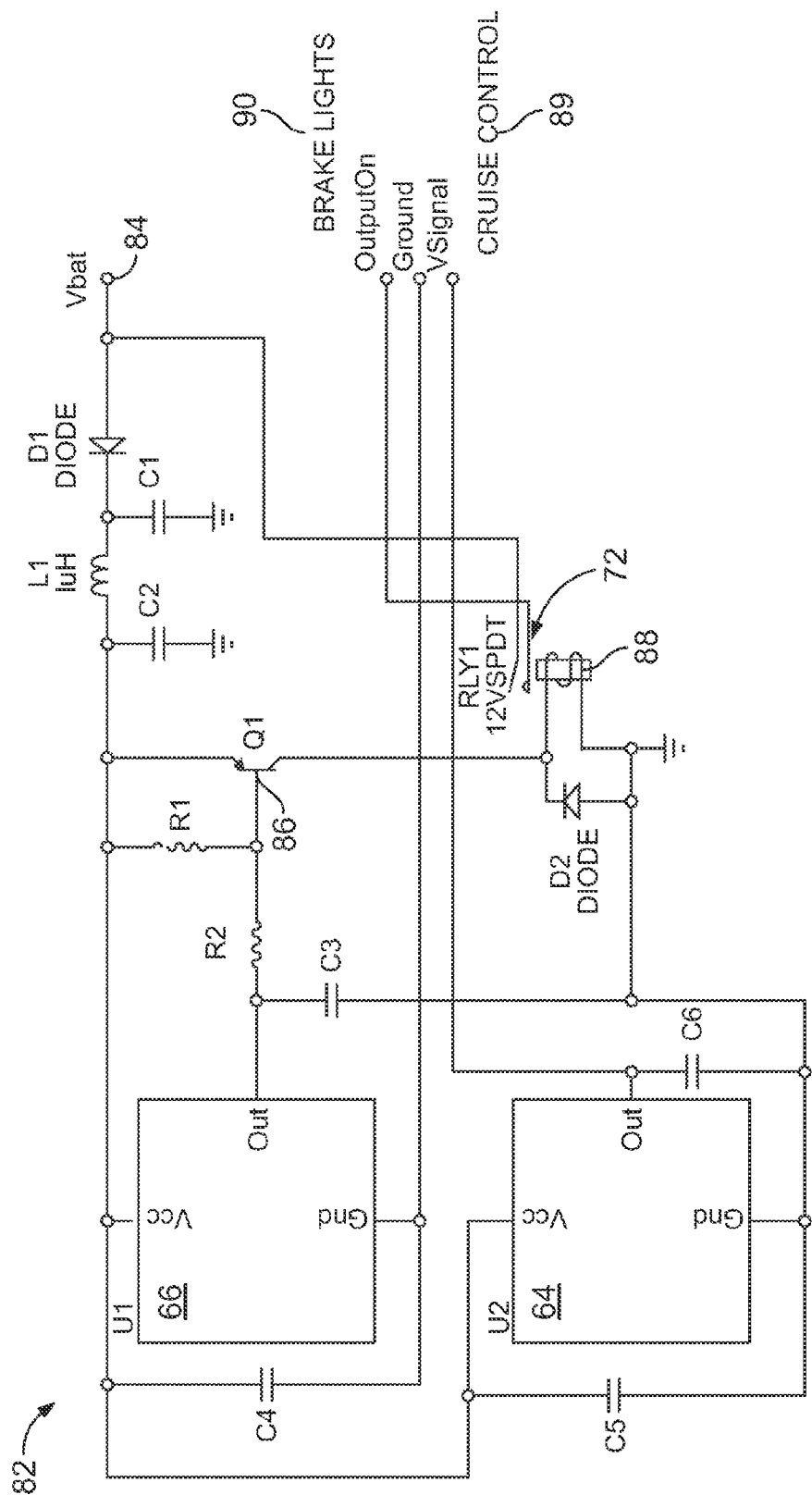
FIG. 8 illustrates a schematic circuit diagram for a brake switch system, according to an embodiment.

FIG. 8 illustrates a schematic circuit diagram for a brake switch system 82, according to an embodiment. The Hall devices 64 and 66 are supplied with power through a battery 84. If the brake pedal is not depressed, the Hall device 66 may be OFF (for example, outputting a low output). Optionally, the Hall device 66 may be ON (for example, outputting a high output). When the brake pedal is not depressed, the transistor 86 is off. Therefore, the output of the Hall device 66 is grounded. In this scenario, the relay 72 is open because the relay 88 is not energized (and therefore unable to switch the relay switch to the closed position).

Similarly, if the brake pedal is not depressed and cruise control is active, the Hall device 64 may be ON (for example, high output). Optionally, the Hall device 64 may be OFF (for example, low output).

However, once the brake pedal is tapped, and assuming cruise control is active, the ferromagnetic target of the brake pedal moving in relation to the magnet 58 (shown in FIGS. 5-7) and the front Hall device 64 causes a change in the magnetic field. The Hall device 64 is programmed to detect this change and switch states. The voltage output from the Hall device 64 switches from high to low (or low to high, depending on how the system in configured), and a signal is sent to a cruise control module 89 to deactivate the cruise control. The Hall device 64 may be programmed to switch from the ON state to the OFF state when it detects a magnetic field having a cruise threshold strength, which is programmed into the Hall device 64. Optionally, other magnetic field change characteristics may be used to switch the Hall device 64 between states.

The cruise threshold strength may be less than a magnetic field strength that switches the Hall device 66 from an OFF to an ON state (that is, the brake light threshold strength). In this manner, the cruise control may be deactivated with a slight tap of the brake pedal, before the brake lights are activated.

However, with increased pressure on the brake pedal, the Hall device 66 is switched from an OFF state to an ON state, or vice versa, depending on how the Hall device 66 is programmed. That is, the Hall device 66 is programmed to detect a change in magnetic field strength that is different (for example, lower or higher, depending on how the Hall devices 64 and 66 are programmed) than the cruise threshold strength. Optionally, other magnetic field change characteristics may be used to switch the Hall device 66 between ON and OFF states. When the Hall device 66 detects the brake light threshold strength, which is different than the cruise threshold strength, the Hall device 66 switches from an OFF state to an ON state. Therefore, the voltage output from the Hall device 66 is high, and the transistor 86 is activated, thereby energizing the relay coil 88, which then causes the relay switch 72 to close, and the brake lights 90 to activate.

Again, the Hall devices 64 and 66 switch states depending on a detected change in magnetic field. The Hall device 64 may switch from ON to OFF to deactivate the cruise control module 89, or the Hall device 64 may switch from OFF to ON to deactivate the cruise control module 89. Similarly, the Hall device 66 may switch from OFF to ON to activate the brake lights, or the Hall device 66 may switch from ON to OFF to activate the brake lights 90. In any case, the switching points that are detected by changes in magnetic field are different for each of the Hall devices 64 and 66. That is, the Hall device 64 switches at a different detected magnetic field characteristic as compared to the Hall device 66.

Once the driver removes his/her foot from the brake pedal, the ferromagnetic target moves toward its at-rest position, and the Hall device 66 returns to the OFF state. Thus, the transistor 86 is deactivated, the relay 72 is opened, and the brake lights 90 are deactivated.

As noted, the Hall devices 64 and 66 may be programmed at different magnetic field levels that do not overlap with one another. That is, the point at which the Hall device 64 switches is not the same as the point at which the Hall device 66 switches. Therefore, the Hall device 64 switches before the Hall device 66 switches, or vice versa, depending on the particular application. For example, the Hall device 64 switches states when it detects a magnetic field characteristic at a first threshold, and the Hall device 66 switches states when it detects a magnetic field characteristic at a second threshold, which is different than the first threshold. For example, the Hall device 64 may switch to an OFF state when it detects a first magnetic field level at a particular mT (milliTesla) level, while the Hall device 66 may switch to an ON state when it detects a magnetic field level at another mT level, which is higher than the first magnetic field level.

Figure 9:
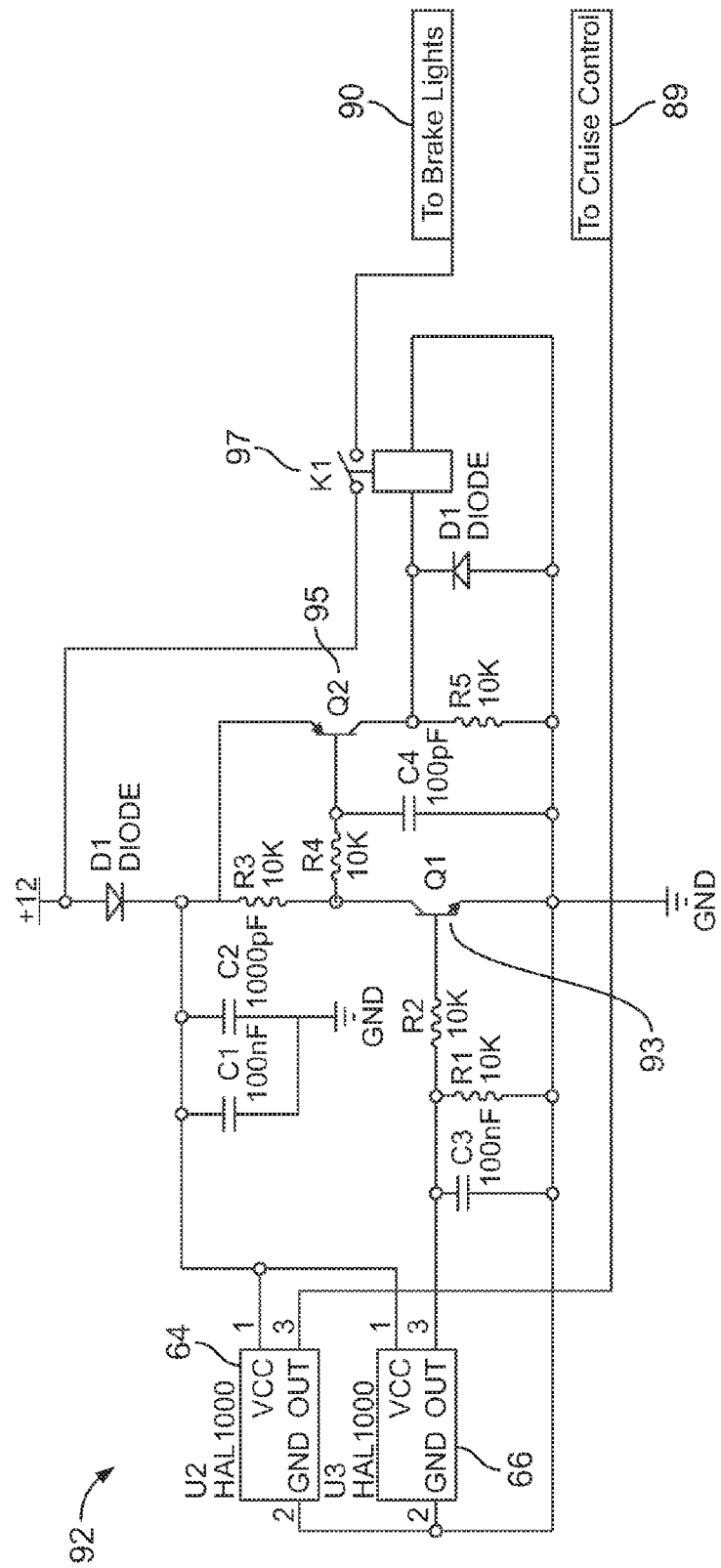
FIG. 9 illustrates a schematic circuit diagram for a brake switch system, according to an embodiment.

FIG. 9 illustrates a schematic circuit diagram for a brake switch system 92, according to an embodiment. The brake switch system 92 is similar to the brake switch system 82 shown in FIG. 8, except that the Hall device 64 is configured to be normally ON when the brake pedal is at rest, and switch OFF when the Hall device 64 detects a threshold to deactivate the cruise control module 89. On the other hand, when Hall device 66 detects its magnetic field threshold, the Hall device 66 switches ON and sends a high output to the gate of the transistor 93. When the Hall device 66 switches ON, the transistor 93 switches on and provides a ground, which pulls the base on transistor 95 low, switching the transistor 295 ON and sending power to the to the relay 97, thereby closing the relay 97 and sending power to the brake lights 90. In this embodiment, the cruise control deactivates when the Hall device 64 switches from an ON state to an OFF state, while the brake lights 90 are activated when the Hall device 66 switches from an OFF state to an ON state.

Figure 10:
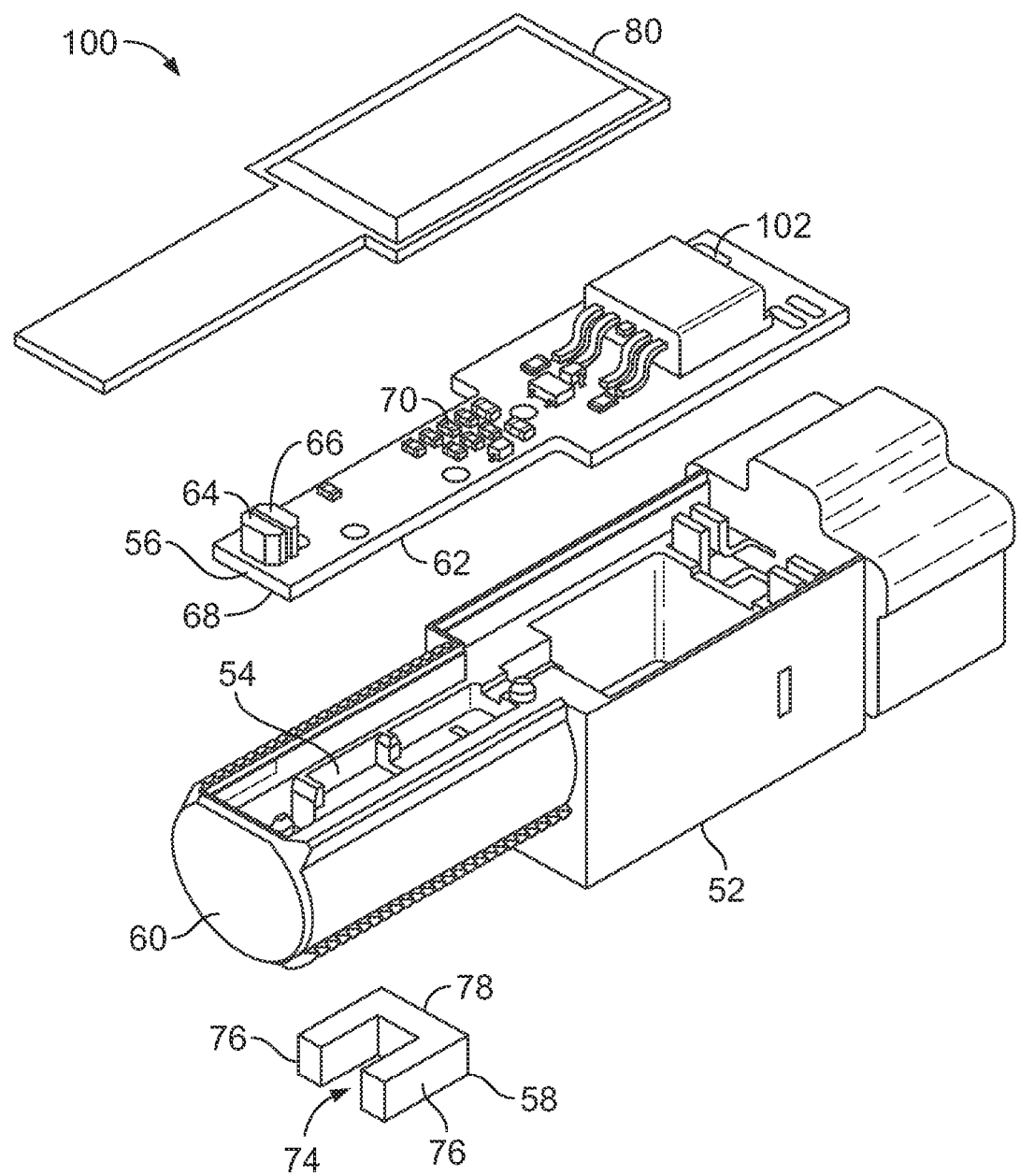
FIG. 10 illustrates an isometric exploded view of a switch assembly, according to an embodiment.

FIG. 10 illustrates an isometric exploded view of a brake switch assembly 100, according to an embodiment. The brake switch assembly 100 is similar to the assembly 50 shown and described with respect to FIG. 5, except that instead of using a relay, the assembly 100 includes a field-effect transistor (FET) 102. The FET 102 is a transistor that relies on an electric field to control the shape and therefore the conductivity of a channel of one type of charge carrier in a semiconductor material. The FET 102 may be a metal-oxide-semiconductor field effect transistor (MOSFET), which may be used to switch electronic signals.

Figure 11:
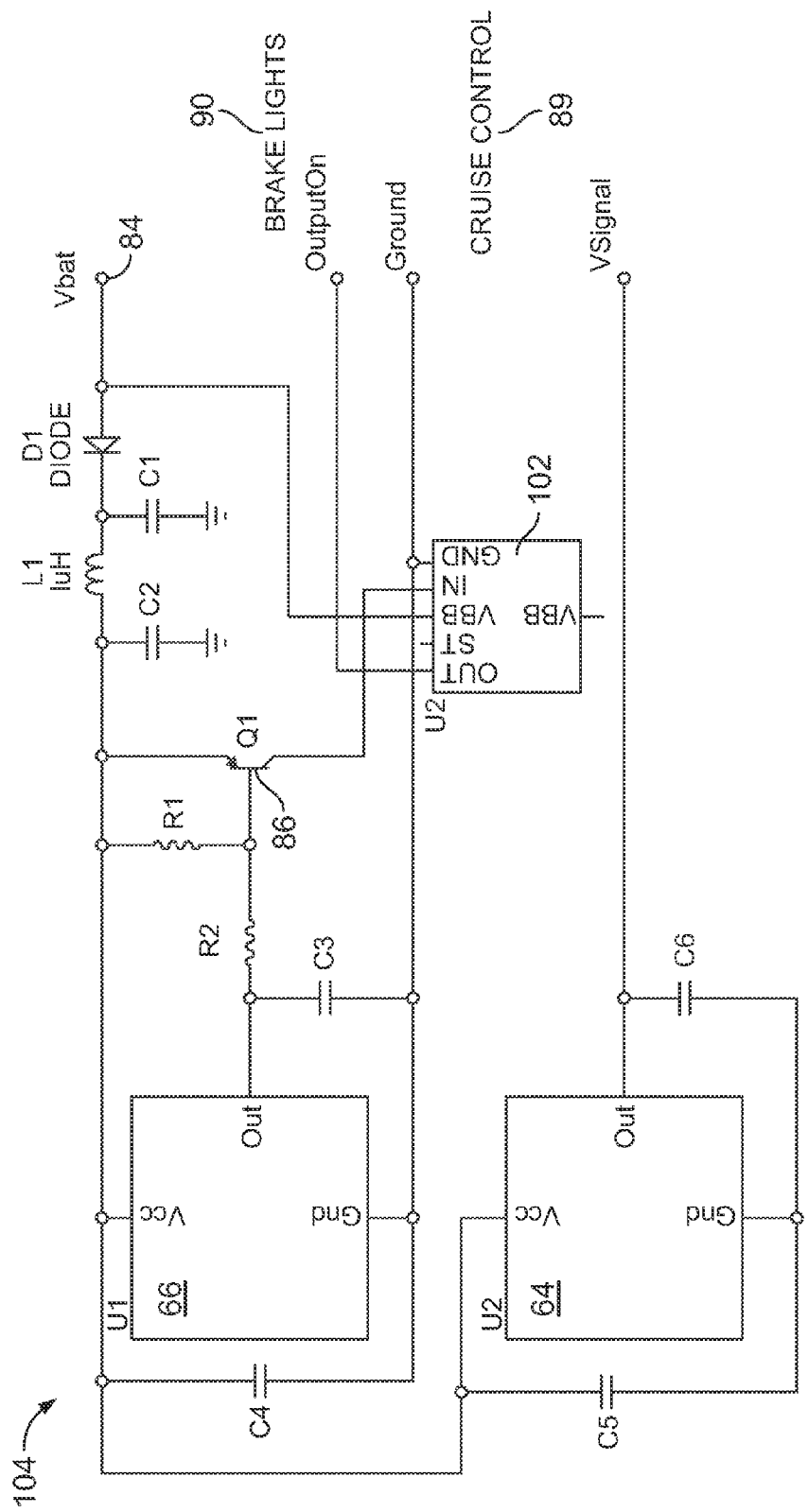
FIG. 11 illustrates a schematic circuit diagram for a brake switch system, according to an embodiment.

FIG. 11 illustrates a schematic circuit diagram for a brake switch system 104, according to an embodiment. The circuit diagram shown in FIG. 11 is similar to that shown in FIG. 8, except that instead of the relay 72 and relay coil 88, the brake switch 104 includes the FET 102.

Figure 12:
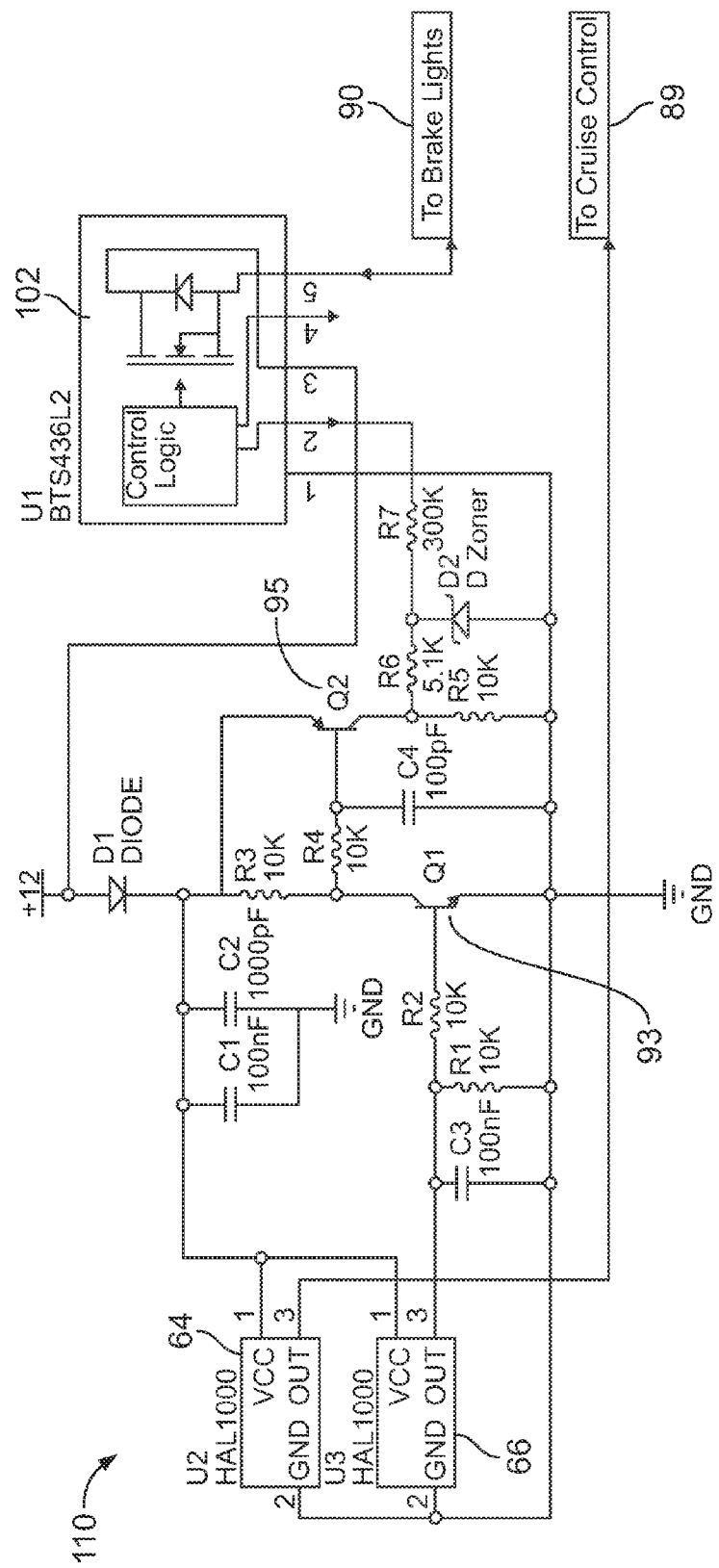
FIG. 12 illustrates a schematic circuit diagram for a brake switch system, according to an embodiment.

FIG. 12 illustrates a schematic circuit diagram for a brake switch system 110, according to an embodiment. The circuit diagram is similar to that shown in FIG. 9, except that instead of a relay, the brake switch 110 uses the FET 102.

Referring to FIGS. 5-12, as discussed above, the Hall devices 64 and 66 may be programmed such that either or both are ON or OFF when the brake pedal is not engaged. For example, both may be OFF, both may be ON, or one may be ON, while the other is OFF. When the brake pedal is pressed, the Hall devices 64 and 66 detect changes in magnetic field at different points, as discussed above. As such, the Hall devices 64 and 66 will switch at different times, thereby deactivating the cruise control and activating the brake lights at different times (notably, the cruise control will be deactivated before the brake lights are activated). Again, the Hall devices 64 and 66 may be programmed to be ON or OFF and switch accordingly.

Thus, embodiments provide a brake switch assembly and system that are configured to activate and deactivate brake lights, as well as deactivate cruise control. More generally, embodiments provide a brake switch assembly having a first Hall device configured to control a first component, and a second Hall device configured to control a second component.

Embodiments provide a non-contacting sensor brake switch assembly having two separate and distinct switching points.

Embodiments provide a contactless device having a single target, single magnet, and two Hall devices in a single package or connector assembly, in which the Hall devices are configured to switch two separate and distinct components. Each Hall device is programmed to switch at a separate and distinct switching point.

Further, embodiments may be used with various other assemblies and systems other than brake switch assemblies and systems. Embodiments may be used as a dual switch point sensor that is configured to be used with any design that utilizes multiple switch points within a single assembly/system.

Embodiments may be used in conjunction with a system for protecting brake lights from over-current and/or over-voltage conditions, such as described in U.S. patent application Ser. No. 13/269,675, entitled "Connector System and Assembly Having Integrated Protection Circuitry," filed Oct. 10, 2011, U.S. Provisional Application No. 61/537,845 entitled "Intelligent Brake Switch System," filed Sep. 22, 2011, and U.S. Application No. 61/537,845, entitled "Intelligent Brake Switch System," filed Sep. 22, 2011, all of which are hereby incorporated by reference in their entireties.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A switch assembly comprising:
  a printed circuit board having first and second sides and first and second ends;
  a U-shaped magnet secured to the printed circuit board proximate the first end, wherein the magnet has opposed posts connected by a cross beam, wherein the opposed posts and the cross beam define an internal gap;
  a first Hall device secured proximate the first end of the printed circuit board within the internal gap, wherein the first Hall device is configured to switch in response to a magnetic field emitted from the magnet having a first magnetic field strength that exceeds a first magnetic field threshold; and
  a second Hall device secured proximate the first end of the primed circuit board within the internal gap in from of or behind the first Hall device, wherein the second Hall device is configured to switch in response to the magnetic field emitted from the magnet having a second magnetic field strength that exceeds a second magnetic field threshold, and wherein the first magnetic field threshold differs from the second magnetic field threshold.

2. The switch assembly of claim 1, wherein the first Hall device is operatively connected to a cruise control module, and wherein the first Hall device switches to deactivate cruise control controlled by the cruise control module.

3. The switch assembly of claim 1, wherein the second Hall device is operatively connected to brake lights, and wherein the second Hall device switches to control activation and deactivation of the brake lights.

4. The switch assembly of claim 3, further comprising a relay electrically connected between the second Hall device and the brake lights.

5. The switch assembly of claim 3, further comprising a field-effect transistor (FET) electrically connected between the second Hall device and the brake lights.

6. The switch assembly of claim 1, wherein a magnetic field of the magnet changes when a ferromagnetic target moves in relation to the magnet.

7. The switch assembly of claim 6, wherein the ferromagnetic target forms part of, or is attached to, a brake pedal.

8. The switch assembly of claim 1, further comprising a main housing having an internal chamber that retains the printed circuit board.

9. The switch assembly of claim 1, wherein the first and second Hall devices are configured to be proximate a ferromagnetic target, and wherein the first and second Hall devices are configured to activate or deactivate first and second components, respectively, based on movement of the ferromagnetic target in relation to one or more of the magnet or the first and second Hall devices.

10. A brake switch system, comprising:
  a brake pedal asset assembly having a ferromagnetic target; and
  a main housing that securely retains a printed circuit board and a U-shaped magnet proximate an end of the printed circuit board, wherein the magnet has opposed posts connected by a cross beam, wherein the opposed posts and the cross beam define an internal gap, wherein a portion of the brake pedal assembly is proximate a portion of the main housing, the printed circuit board comprising:
    a first Hall device secured proximate the end of the printed circuit board within the internal gap, wherein the first Hall device is configured to switch in response to a magnetic field emitted from the magnet having a first magnetic field strength that exceeds a first magnetic field threshold; and
    a second Hall device secured proximate the end of the printed circuit board within the internal gap in front of or behind the first Hall device, wherein the second Hall device is configured to switch in response to the magnetic field emitted from the magnet having a second magnetic field strength that exceeds a second magnetic field threshold, and wherein the first magnetic field threshold differs from the second magnetic field threshold.

11. The brake switch system of claim 10, wherein the first Hall device is operatively connected to a cruise control module, and wherein the first Hall device switches to deactivate cruise control controlled by the cruise control module.

12. The brake switch system of claim 10, wherein the second Hall device is operatively connected to brake lights, and wherein the second Hall device switches to control activation and deactivation of the brake lights.

13. The brake switch system of claim 12, wherein the printed circuit board further comprises a relay electrically connected between the second Hall device mid the brake lights.

14. The brake switch system of claim 12, wherein the printed circuit board further comprises a field-effect transistor (FET) electrically connected between the second Hall device and the brake lights.

15. The brake switch system of claim 10, wherein a magnetic field of the magnet changes when the ferromagnetic target moves in relation to the magnet.

16. An assembly comprising:
  a single main housing that securely retains a punted circuit board and a U-shaped magnet proximate an end of the printed circuit board, wherein the magnet has opposed posts connected by a cross beam, wherein the opposed posts and the cross beam define an internal gap;
  a first Hall device secured with the single main housing proximate the end of the printed circuit hoard within the internal gap, the first Hall device being configured to control activation and/or deactivation of one of a cruise control module or brake lights; and
  a second Hall device secured within the single main housing proximate the end of the printed circuit board within the internal gap in front of or behind the first Hall device, the second Hall device being configured to control activation and/or deactivation of the other of the cruise control module or brake lights.

* * * * *